N. GAMBINO.
AUTOMATIC RELIEF VALVE.
APPLICATION FILED JULY 26, 1907.
938,570.
Patented Nov. 2, 1909.
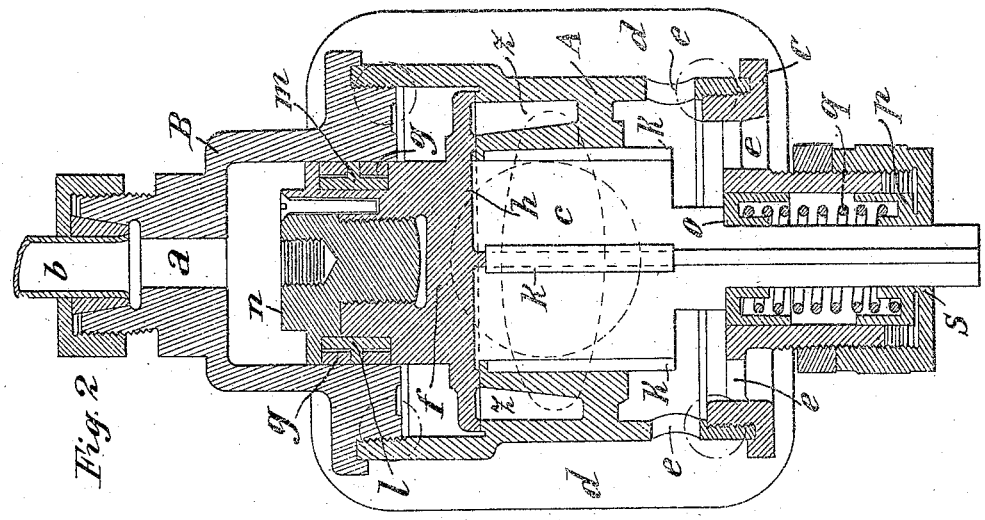
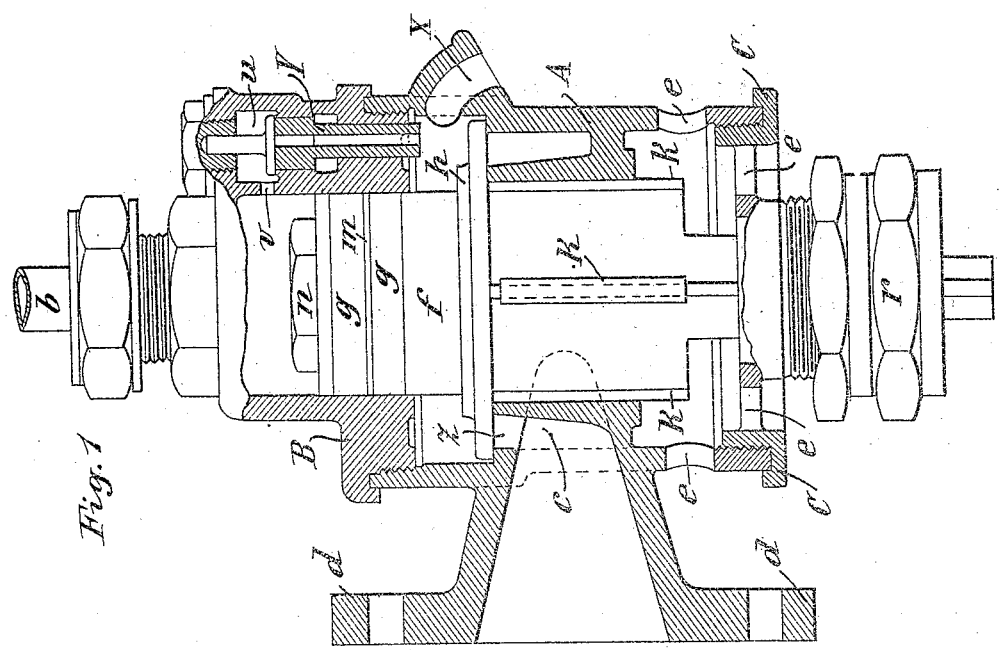
WITNESSES.
INVENTOR.
Nunzio Gambino,
Attorneys.

UNITED STATES PATENT OFFICE.

NUNZIO GAMBINO, OF PALERMO, ITALY.

AUTOMATIC RELIEF-VALVE.

938,570.        Specification of Letters Patent.        Patented Nov. 2, 1909.

Application filed July 26, 1907. Serial No. 385,670.

*To all whom it may concern:*

Be it known that I, NUNZIO GAMBINO, a subject of the King of Italy, residing at Palermo, Italy, have invented new and useful Improvements in Automatic Relief-Valves, of which the following is a specification.

This invention relates to the automatic water exhaust of an automatic steam cylinder valve which is particularly adapted for cylinders of compound locomotives.

In the annexed drawings a form of construction of the new water exhaust is shown.

Figure 1 is an elevation and Fig. 2 a longitudinal section.

The valve casing is made entirely of bronze and is composed of three parts, which are the middle valve body A, the upper cover B and the lower cover G. These bodies form in the usual manner three chambers B', A', C'. The upper chamber B' communicates with the slide chamber of the cylinder by means of a pipe $b$ and a passage $a$. The pipe $b$ is fixed to the cover of the valve by means of hasp screws. The second chamber A' communicates with the one end of the cylinder by means of a passage $c$ which is fastened by the flange $d$ to the cylinder. The third chamber C' communicates with the atmosphere by means of a plurality of small holes $e$ which are arranged in the lower part of the valve body A and in the lower cover G.

In the upper cover B a piston $f$ slides tightly and which is provided with two bronze piston rings $g$. This piston $f$ coacts with the double-seated valve $h$ which is guided in the valve body A by means of four wings $k$. The piston rings $g$ are carried by a shell $l$ which is provided with a boss $m$ and is held in place by a screw plug $n$ screwed into the piston $f$. The other side of the valve body $h$, that is, the prolongation of the four wings $k$ terminates outside of the body $c$ and passes through guides $o$, $p$, a spring $q$ and a hasp screw $r$. The spring $q$ is intended to compensate the shocks transmitted by the piston to the valve seats. The spring plate $p$ or guide presses with a small surface upon a hasp screw or nut $r$, so as to prevent the spring $q$ rotating around itself and becoming deformed when the hasp screw is tightened to adjust the tension of the spring. After having regulated the tension of the spring, the hasp screw or check nut $r$ is tightened whereby the spring is held in invariable tension and thereby a regular working of the valve is assured.

On the cover B is formed a small chamber $u$ which communicates by means of an opening $v$ with the space between the passage $a$ and the piston $f$. At the lower end this chamber $u$ is connected with an outlet $x$ by means of a small relief valve $y$. The valve $y$ has the purpose to evacuate the chamber B' of the condensed steam at the moment when the regulator is closed, so that at the same time the chamber is lubricated by the oil drawn along with the steam.

The working of the valve is as follows: When the regulator is closed the pressure in the chamber B' and in the annular passage $z$ ceases. Now when the valve $h$ opens at the suction or pressure stroke of the piston it strikes against the valve rod of the small valve $y$ and lifts the same so that the opening $v$ is placed into communication with the passage $x$, while at the same time condensed steam can leave the chamber B.

What I claim is:

In an automatic relief valve for steam cylinders, a valve casing divided into three chambers, an upper chamber adapted for being put into communication with the steam-chest, the middle chamber adapted to be put into communication with the cylinder, and the lower chamber adapted to be put into communication with the atmosphere, a piston working in the upper chamber and provided with adjustable bronze packing, a spring in the lower chamber adapted to relieve the shocks in the valve seats, a double seated valve coöperating with the piston, in combination with an exhaust valve communicating with the upper casing portion, and adapted to be operated by the piston and the double seated valve, substantially as set forth.

In testimony whereof I have signed my name to this specification in the presence of two subscribing witnesses.

NUNZIO GAMBINO.

Witnesses:
 DOMINICO CARUPE,
 GIUSEPPE CAPPADONIA.